United States Patent
Seo et al.

(10) Patent No.: US 9,531,306 B2
(45) Date of Patent: Dec. 27, 2016

(54) ELECTRONIC STABILITY CONTROL SYSTEM, AND METHOD FOR DETECTING A FAULT OF MOTOR FREEWHEELING FET CIRCUIT

(71) Applicant: MANDO CORPORATIONI, Pyeongtaek-si, Gyeonggi-do (KR)

(72) Inventors: Jung Wook Seo, Osan-si (KR); Kawn Seek Kim, Hwaseong-si (KR); Chang Woo Lee, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 84 days.

(21) Appl. No.: 14/718,386

(22) Filed: May 21, 2015

(65) Prior Publication Data

US 2015/0340978 A1   Nov. 26, 2015

(30) Foreign Application Priority Data

May 21, 2014   (KR) ........................ 10-2014-0060896

(51) Int. Cl.
| H02P 7/29 | (2016.01) |
| H02P 29/02 | (2016.01) |
| H02P 6/12 | (2006.01) |
| B60W 50/02 | (2012.01) |

(52) U.S. Cl.
CPC ................ *H02P 6/12* (2013.01); *B60W 50/02* (2013.01)

(58) Field of Classification Search
CPC .............. H02P 15/00; H02P 15/02; H02P 1/21
USPC .......................................... 318/481, 430–434
See application file for complete search history.

(56) References Cited

U.S. PATENT DOCUMENTS

| 5,733,017 A * | 3/1998 | Nakashima | B60T 8/4036 303/10 |
| 7,589,490 B2 * | 9/2009 | Haesters | G01R 19/0092 318/471 |
| 7,772,725 B2 * | 8/2010 | Siman-Tov | H02M 3/157 307/140 |
| 8,803,462 B2 * | 8/2014 | Okamoto | H02P 29/0241 318/245 |

FOREIGN PATENT DOCUMENTS

JP      2012188101 A    10/2012

* cited by examiner

*Primary Examiner* — Bentsu Ro
(74) *Attorney, Agent, or Firm* — Hauptman Ham, LLP (57) ABSTRACT

Disclosed herein is an electronic stability control system including: a motor driver configured to include a motor switch for driving a motor unit depending on a PWM signal and a freewheeling switch and a reverse protection switch for checking whether the motor unit is normally operated; and a controller configured to turn off all of the motor switch, the freewheeling switch, and the reverse protection switch, turn off only the motor switch and the reverse protection switch, or turn off only the motor switch and the freewheeling switch, apply a diagnostic current, and then detect a fault state of the freewheeling switch or the reverse protection switch, or the freewheeling switch and the reverse protection switch by using a voltage detector.

12 Claims, 6 Drawing Sheets

ELECTRONIC STABILITY CONTROL SYSTEM, AND METHOD FOR DETECTING A FAULT OF MOTOR FREEWHEELING FET CIRCUIT

BACKGROUND OF THE INVENTION

Field of the Invention

Exemplary embodiments of the present invention relate to an electronic stability control (hereinafter, ESC) system and a method for detecting a fault of a motor freewheeling circuit, and more particularly, to an electronic stability control (ESC) system and a method for detecting a fault of a motor freewheeling switch capable of detecting a fault using a freewheeling switch and a reverse protection switch for compensating for a counter electromotive force generated when an operation of a pump motor is turned off, in the case in which the electronic stability control system performs a pulse width modulation (PWM) control on the pump motor.

Description of the Related Art

Generally, an electronic stability program (ESP) or an electronic stability control (hereinafter, ESC) system are a system which selectively operate front, rear, left, and right clutched wheels to prevent a skid of a vehicle occurring under extremely instable situations like acceleration, braking, or cornering to stably hold an attitude of a vehicle and correct driver's mistakes.

The existing ESC system outputs a pulse width modulation (hereinafter, referred to as PWM) signal of a predetermined duty ratio to drive a motor for the ESC which determines a discharge rate of a hydraulic pump for vehicle braking.

Figure 6:
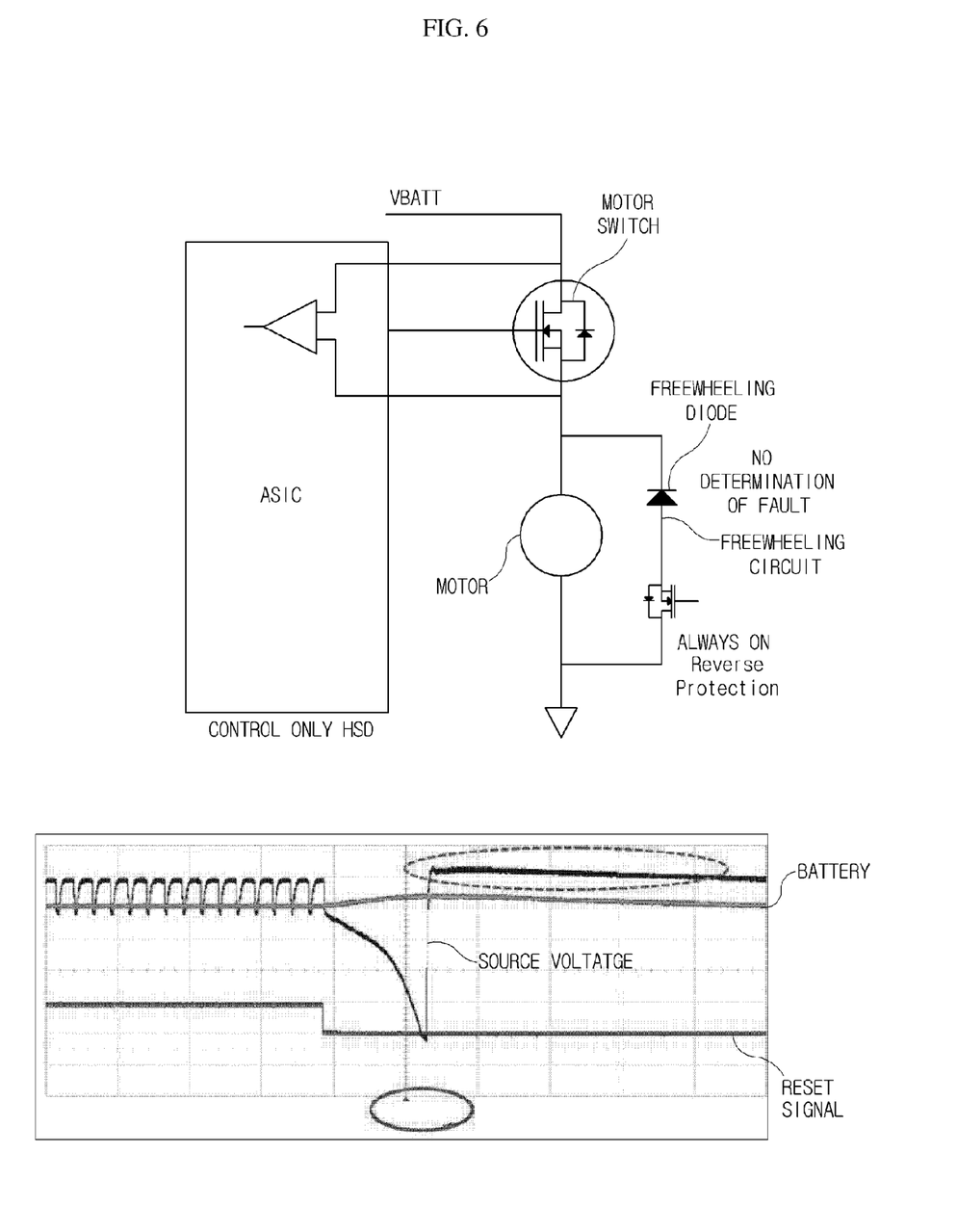
FIG. 6 is a diagram illustrating a circuit configuration having a freewheeling diode and a reverse protection switch for performing the existing PWM control on a motor and an output graph thereof. The output graph illustrates a fault mode in case that a freewheeling diode or a reverse protection switch is disconnected during performing the existing PWM control.

FIG. 6 is a diagram illustrating a circuit configuration having a freewheeling diode and a reverse protection switch for performing the existing PWM control on a motor and an output graph thereof. The output graph illustrates a fault mode in case that a freewheeling diode or a reverse protection switch is disconnected during performing the existing PWM control. As the existing ESC system uses the freewheeling diode for performing the PWM control on the motor as illustrated in FIG. 6, there is no method for finding out a stuck of the diode without driving the motor. That is, FIG. 6 illustrates a source voltage controlling the motor based on the PWM as a waveform and an operation of a circuit which stops the driving of the motor using a reset signal. In this case, the motor is being driven and thus a surge voltage is generated while the freewheeling circuit is turned off. In this case, since a negative surge voltage depending on a current flowing in the motor is larger than the waveform, a motor switch may not also stand the surge voltage.

RELATED ART DOCUMENT

Patent Document (Patent Document 1) Japanese Patent Laid-Open Publication No. 2012-188101 (Published Oct. 04, 2012).

SUMMARY OF THE INVENTION

An object of the present invention is to provide an electronic stability control system and a method for detecting a fault of a motor freewheeling circuit capable of detecting a fault of a freewheeling switch and a reverse protection switch using the freewheeling switch and the reverse protection switch for compensating for a counter electromotive force generated when an operation of a pump motor is turned off, in the case in which the electronic stability control system performs a pulse width modulation control on the pump motor.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an electronic stability control system includes: a motor unit configured to be connected to a hydraulic pump pumping a brake fluid discharged from a wheel cylinder and circulating the brake fluid to the wheel cylinder again to operate the hydraulic pump depending on a PWM signal; a pulse width modulator configured to generate a PWM signal for driving the motor unit depending on a predetermined control signal; a motor driver configured to include a motor switch for driving the motor unit depending on the PWM signal and a freewheeling switch and a reverse protection switch for checking whether the motor unit is normally operated; a power supply unit configured to supply power for an operation of the motor unit, the pulse width modulator, and the motor driver; and a controller configured to turn off all of the motor switch, the freewheeling switch, and the reverse protection switch, turn off only the motor switch and the reverse protection switch, or turn off only the motor switch and the freewheeling switch, apply a diagnostic current, and then detect a fault state of the freewheeling switch or the reverse protection switch, or the freewheeling switch and the reverse protection switch by using a voltage detector.

All of the motor switch, the freewheeling switch, and the reverse protection switch may use a field effect transistor (FET).

All the field effect transistors (FETs) of the motor switch, the freewheeling switch, and the reverse protection switch may be connected to diodes, respectively.

The controller may make the diagnostic current flow in the freewheeling switch in a state in which all of the motor switch, the freewheeling switch, and the reverse protection switch are turned off to make the diagnostic current flow in the diodes of the freewheeling switch and the reverse protection switch since all the switches are turned off so as to detect the fault based on the fact that a voltage drop is not generated when one or two of the freewheeling switch and the reverse protection switch are in a short state or a stuck on state.

The controller may turn on only the freewheeling switch and then make the diagnostic current flow, in the state in which only the motor switch and the reverse protection switch are turned off to detect the voltage drop generated when the freewheeling switch is in a stuck-off state or an open state.

The controller may turn on only the reverse protection switch and then make the diagnostic current flow, in the state in which only the motor switch and the freewheeling switch are turned off to detect the fault based on the voltage drop generated when the reverse protection switch is in a stuck-off state or an open state.

In accordance with another aspect of the present invention, a method for detecting a fault of a motor freewheeling switch of an electronic stability control system including a motor switch for driving a motor unit, a motor driver including a freewheeling switch and a reverse protection switch for checking whether the motor unit is normally operated, a pulse width modulator, and a controller includes: (a) applying, by the controller, a predetermined control signal to the pulse width modulator; (b) generating, by the pulse width modulator, a PWM signal for driving the motor unit depending on a predetermined control signal; (c) driving, by the motor driver, the motor unit depending on the PWM signal; and (d) turning off, by the controller, the motor switch, the freewheeling switch, and the reverse protection switch depending on a specific combination, applying a diagnostic current, and detecting a fault state of the freewheeling switch and the reverse protection switch by using a voltage detector.

All of the motor switch, the freewheeling switch, and the reverse protection switch may be operated by using a field effect transistor (FET).

The diagnostic current may flow in each diode connected to each field effect transistor (FET) when all of the motor switch, the freewheeling switch, and the reverse protection switch are in a turned off state.

In the step (d), the controller may make the diagnostic current flow in the freewheeling switch in a state in which all of the motor switch, the freewheeling switch, and the reverse protection switch are turned off to make the diagnostic current flow in the diodes of the freewheeling switch and the reverse protection switch since all the switches are turned off so as to detect the fault based on the fact that a voltage drop is not generated when one or two of the freewheeling switch and the reverse protection switch are in a short state or a stuck on state.

In the step (d), the controller may turn on only the freewheeling switch and then make the diagnostic current flow, in the state in which only the motor switch and the reverse protection switch are turned off to detect the fault based on the voltage drop generated when the freewheeling switch is in a stuck-off state or an open state.

In the step (d), the controller may turn on only the reverse protection switch and then make the diagnostic current flow, in the state in which only the motor switch and the freewheeling switch are turned off to detect the fault based on the voltage drop generated when the reverse protection switch is in a stuck-off state or an open state.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a diagram an example for detecting a fault in a state in which a motor switch and a reverse protection switch according to an exemplary embodiment of the present invention are turned off and only the freewheeling switch is turned on;

FIG. 5 is a diagram an example for detecting a fault in a state in which the motor switch and the freewheeling switch according to the exemplary embodiment of the present invention are turned off and only the reverse protection switch is turned on.

DESCRIPTION OF SPECIFIC EMBODIMENTS

The present invention may be modified in various ways and implemented by various exemplary embodiments, so that specific exemplary embodiments are shown in the drawings and will be described in detail. However, it is to be understood that the present invention is not limited to a specific exemplary embodiment, but includes all modifications, equivalents, and substitutions without departing from the scope and spirit of the present invention.

An electronic stability control system and a method for detecting a fault of a motor freewheeling circuit according to exemplary embodiments of the present invention will be described in detail with reference to the accompanying drawings. In describing with reference to the accompanying drawings, same or similar components are denoted by the same reference numerals and an overlapping description thereof will be omitted.

Figure 1:
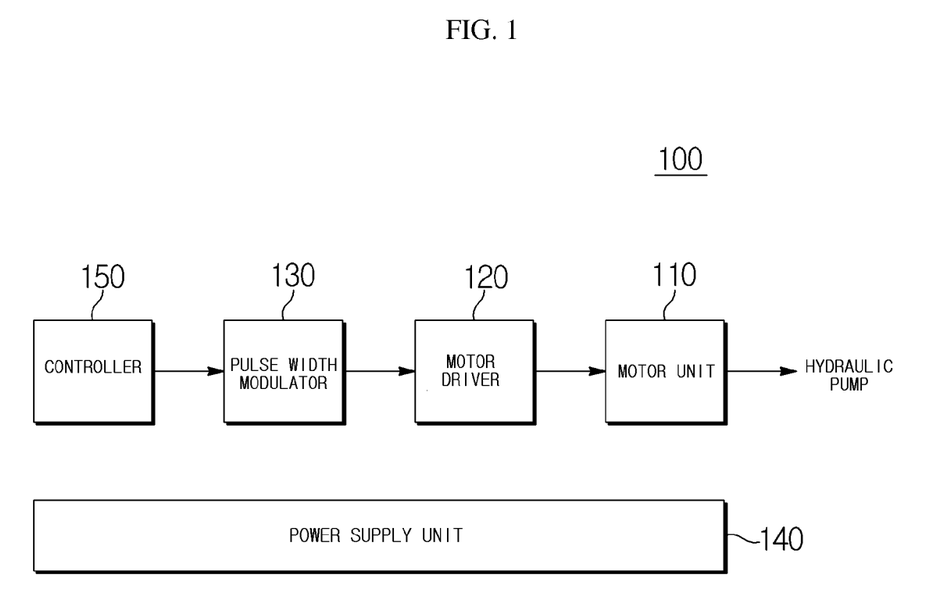
FIG. 1 is a configuration diagram schematically illustrating an function block of an electronic stability control system according to an exemplary embodiment of the present invention.

FIG. 1 is a configuration diagram schematically illustrating a function block of an electronic stability control system according to an exemplary embodiment of the present invention.

Referring to FIG. 1, an electronic stability control system 100 according to an exemplary embodiment of the present invention includes a motor unit 110, a motor driver 120, a pulse width modulator 130, a power supply unit 140, and a controller 150.

The motor unit 110 is connected to a hydraulic pump which pumps a brake fluid discharged from a wheel cylinder and circulates the brake fluid to the wheel cylinder again to operate the hydraulic pump depending on a PWM signal.

The motor driver 120 is configured to include a motor switch for driving the motor unit depending on the PWM signal and a freewheeling switch and a reverse protection switch for checking whether the motor unit is normally operated.

The pulse width modulator 130 generates the PWM signal for driving the motor unit depending on a predetermined control signal.

The power supply unit 140 supplies power for operating the motor unit 110, the pulse width modulator 130, and the motor driver 120.

The controller 150 turns off all of the motor switch, the freewheeling switch, and the reverse protection switch, turns off only the motor switch and the reverse protection switch, or turns off only the motor switch and the freewheeling switch, applies a diagnostic current, and then detects a fault state of the freewheeling switch or the reverse protection switch, or the freewheeling switch and the reverse protection switch using a voltage detector.

Figure 3:
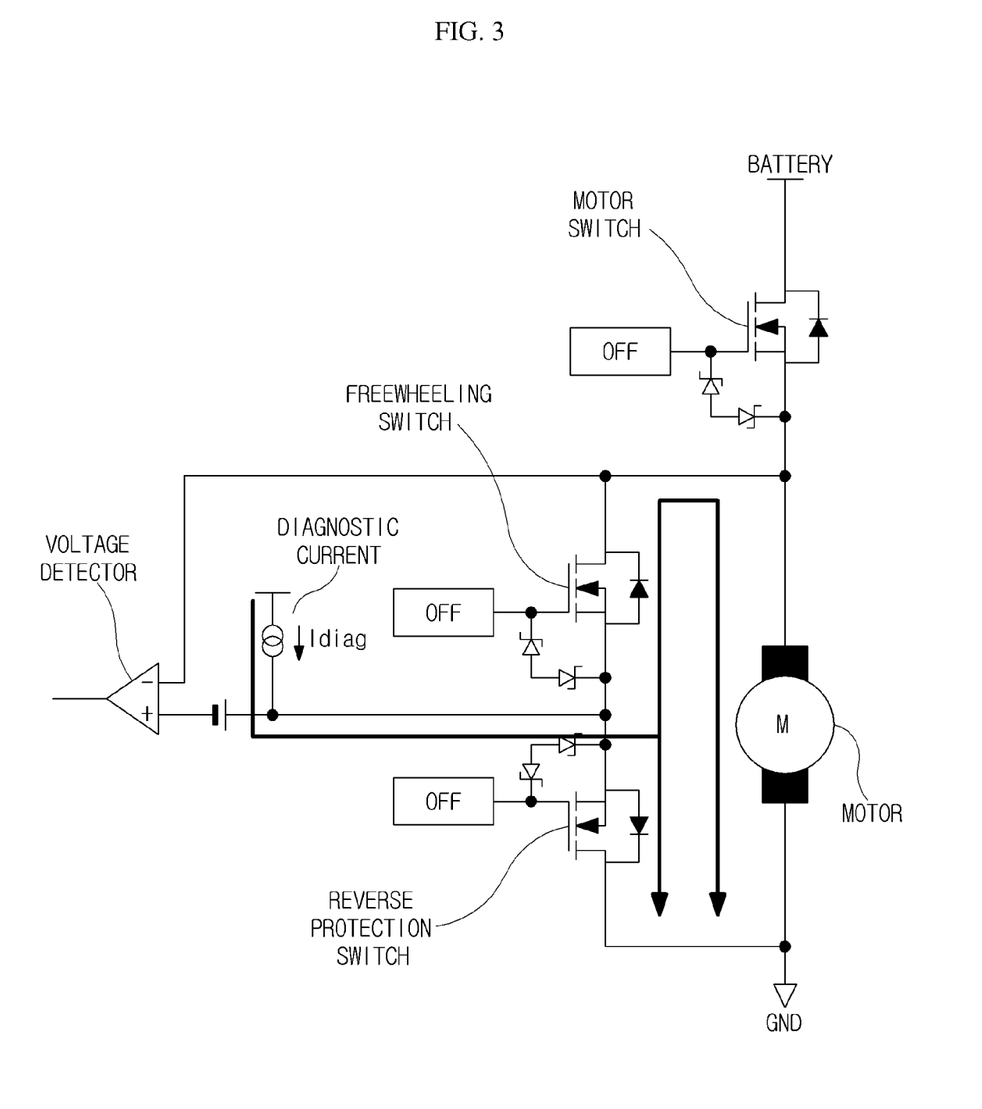
FIG. 3 is a diagram illustrating an example of detecting a fault in a state in which all FETs according to an exemplary embodiment of the present invention are turned off.
Figure 4:
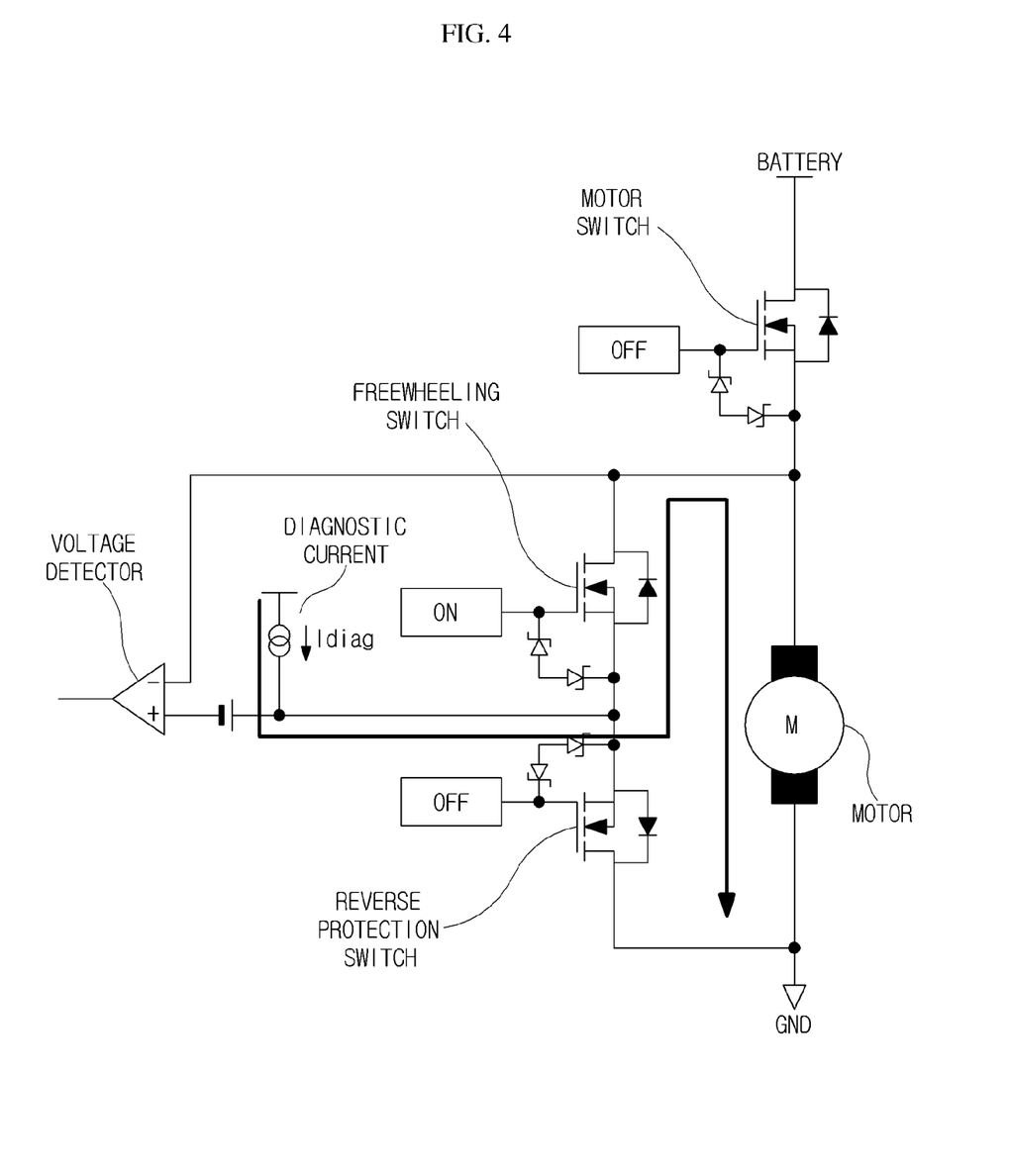
Figure 5:
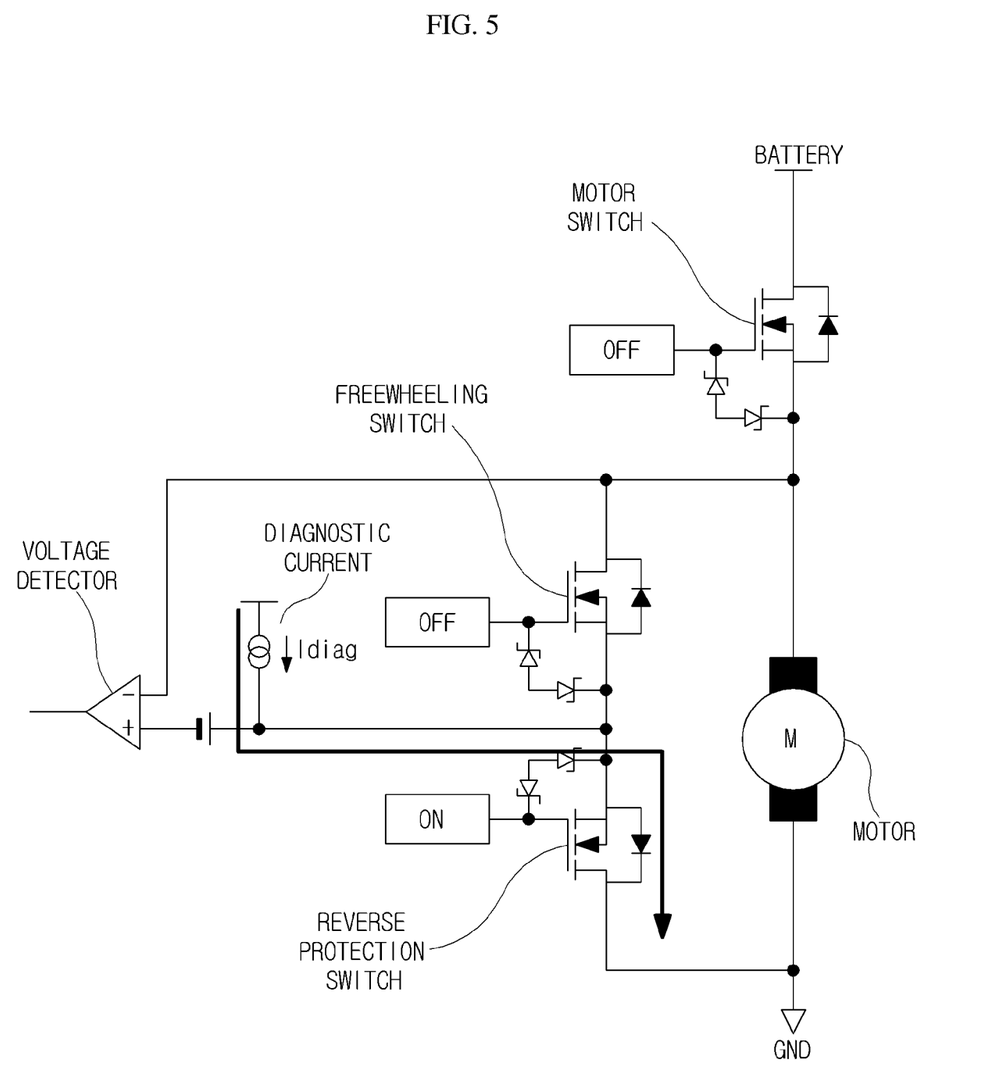

Here, the motor switch, the freewheeling switch, and the reverse protection switch all use, for example, a field effect transistor (FET) as illustrated in FIGS. 3 to 5.

Further, all the field effect transistors (FETs) of the motor switch, the freewheeling switch, and the reverse protection switch are connected to diodes, respectively, as illustrated in FIGS. 3 to 5.

Further, the controller makes the diagnostic current flow in the freewheeling switch in the state in which all of the motor switch, the freewheeling switch, and the reverse protection switch are turned off to make the diagnostic current flow in the diodes of the freewheeling switch and the reverse protection switch since all the switches are turned off so as to detect the fault based on the fact that a voltage drop is not generated when one or two of the freewheeling switch and the reverse protection switch are in a short state or a stuck on state.

Further, the controller turns on only the freewheeling switch and then makes the diagnostic current flow, in the state in which only the motor switch and the reverse protection switch are turned off to detect the fault based on the fact that the voltage drop is generated when the freewheeling switch is in a stuck-off state or an open state.

Further, the controller turns on only the reverse protection switch and then makes the diagnostic current flow in the state in which only the motor switch and the freewheeling switch are turned off to detect the fault based on the fact that the voltage drop is generated when the reverse protection switch is in a stuck-off state or an open state.

Figure 2:
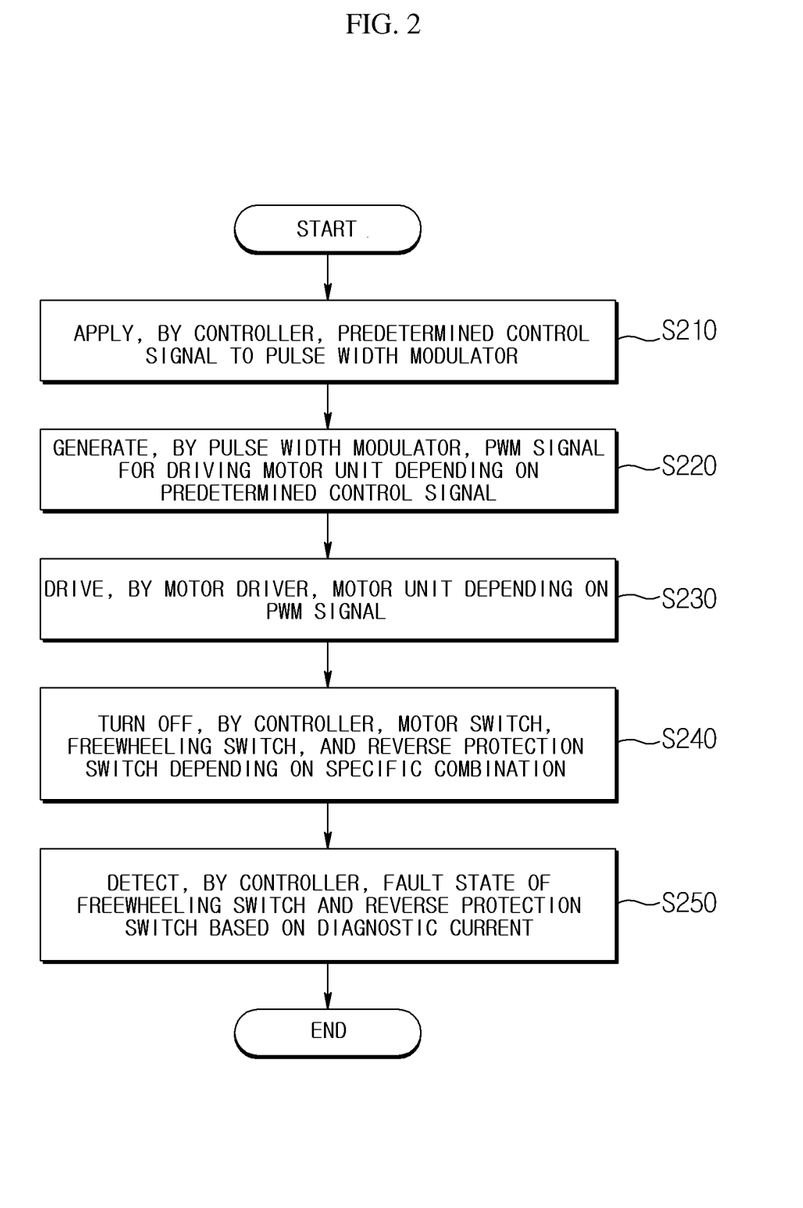
FIG. 2 is a diagram illustrating an operation flow chart for describing a method for detecting a fault of a motor freewheeling circuit of an electronic stability control system according to an exemplary embodiment of the present invention.

FIG. 2 is a diagram illustrating an operation flow chart for describing a method for detecting a fault of a motor freewheeling circuit of an electronic stability control system according to an exemplary embodiment of the present invention.

Referring to FIG. 2, the ESC system 100 according to the exemplary embodiment of the present invention allows the controller to apply a predetermined control signal to a pulse width modulator (S210).

Next, the pulse width modulator generates a PWM signal for driving the motor unit depending on the predetermined control signal (S220).

Next, the motor driver drives the motor unit depending on the PWM signal (S230).

In this case, the motor switch, the freewheeling switch, and the reverse protection switch all are a switching device as illustrated in FIG. 3 and are operated using, for example, a field effect transistor (FET).

Next, the controller turns off the motor switch, the freewheeling switch, and the reverse protection switch depending on a specific combination (S240).

In this case, when the motor switch, the freewheeling switch, and the reverse protection switch are in a turned off, the diagnostic current flows in each diode which is connected to each field effect transistor (FET).

Further, the controller 150 detects the fault state of the freewheeling switch and the reverse protection switch based on the diagnostic current (S250).

Further, as illustrated in FIG. 3, the controller makes the diagnostic current flow in the freewheeling switch in the state in which all of the motor switch, the freewheeling switch, and the reverse protection switch are in the turned off state to make the diagnostic current flow in the diodes of the freewheeling switch and the reverse protection switch since all the switches are turned off. FIG. 3 is a diagram illustrating an example of detecting a fault in a state in which all FETs according to an exemplary embodiment of the present invention are turned off. All the FETs are turned off and a diagnostic current Idiag flows. Since all the FETs are turned off, the current flows in body diodes of the freewheeling switch and the reverse protection switch, which generates a voltage drop of at least 0.5V. Therefore, the controller 150 detects the fault based on the fact that the voltage drop is not generated when one or two of the freewheeling switch and the reverse protection switch are in the short state or the stuck on state.

Further, the controller turns on only the freewheeling switch and then makes the diagnostic current flow in the state in which only the motor switch and the reverse protection switch are in the turned off state as illustrated in FIG. 4. FIG. 4 is a diagram an example for detecting a fault in a state in which a motor switch and a reverse protection switch according to an exemplary embodiment of the present invention are turned off and only the freewheeling switch is turned on. Therefore, the controller 150 detects the fault based on the fact that the voltage drop is generated when the freewheeling switch is in the stuck-off state or the open state. That is, the motor switch and the reverse protection switch are turned off, only the freewheeling switch is turned on, and then the diagnostic current Idiag flows. If the freewheeling switch is in the stuck-off state or the open state, the voltage drop of 0.5V or more is generated and thus the fault may be detected using the voltage detector.

Further, the controller turns on only the reverse protection switch and then makes the diagnostic current flow in the state in which only the motor switch and the reverse protection switch are in the turned off state as illustrated in FIG. 5. FIG. 5 is a diagram an example for detecting the fault in a state in which the motor switch and the freewheeling switch according to the exemplary embodiment of the present invention are turned off and only the reverse protection switch is turned on. Therefore, the controller 150 detects the fault based on the fact that the voltage drop is generated when the reverse protection switch is in the stuck-off state or the open state. That is, the motor switch and the reverse protection switch are turned off, only the reverse protection switch is turned on, and then the diagnostic current Idiag flows. If the reverse protection switch is in the stuck-off state or the open state, the voltage drop of 0.5V or more is generated and thus the fault may be detected using the voltage detector.

As described above, according to the exemplary embodiment of the present invention, it is possible to realize the electronic stability control system and the method for detecting a fault of a motor freewheeling circuit capable of detecting the fault using the freewheeling switch and the reverse protection switch for compensating for the counter electromotive force generated when the operation of the pump motor is turned off, in the case in which the electronic stability control system performs the pulse width modulation control on the pump motor.

Those skilled in the art will appreciate that since various modifications and alterations may be made without departing from the spirit or essential feature of the present invention, the above-mentioned embodiments are not restrictive but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

The exemplary embodiment of the present invention may be applied to the electronic stability control system and the method for detecting a fault of a motor freewheeling circuit capable of detecting the fault using the freewheeling switch and the reverse protection switch for compensating for the counter electromotive force generated when the operation of the pump motor is turned off, in the case in which the electronic stability control system performs the pulse width modulation control on the pump motor.

According to the exemplary embodiments of the present invention, the freewheeling circuit may be used to improve the efficiency and control the PWM driving at the time of controlling the pump motor of the electronic stability control (ESC) system and the FET may be used to diagnose the default of the device, thereby achieving the improvement in safety.

Further, it is possible to always check whether the freewheeling circuit fails even at the time of the non-driving of the pump motor and drastically increase the required diagnostic coverage in the ISO standard by implementing the self-diagnostic function of the device.

Although the present invention was described above with reference to exemplary embodiments, it should be understood that the present invention may be changed and modified in various ways by those skilled in the art, without departing from the spirit and scope of the present invention described in claims.

What is claimed is:

1. An electronic stability control system, comprising:
 a motor unit configured to be connected to a hydraulic pump pumping a brake fluid discharged from a wheel cylinder and circulating the brake fluid to the wheel cylinder again to operate the hydraulic pump depending on a PWM signal;
 a pulse width modulator configured to generate a PWM signal for driving the motor unit depending on a predetermined control signal;
 a motor driver configured to include a motor switch for driving the motor unit depending on the PWM signal and a freewheeling switch and a reverse protection switch for checking whether the motor unit is normally operated;
 a power supply unit configured to supply power for an operation of the motor unit, the pulse width modulator, and the motor driver; and
 a controller configured to turn off all of the motor switch, the freewheeling switch, and the reverse protection switch, turn off only the motor switch and the reverse protection switch, or turn off only the motor switch and the freewheeling switch, apply a diagnostic current, and then detect a fault state of the freewheeling switch or the reverse protection switch, or the freewheeling switch and the reverse protection switch by using a voltage detector.

2. The electronic stability control system of claim 1, wherein all of the motor switch, the freewheeling switch, and the reverse protection switch use a field effect transistor (FET).

3. The electronic stability control system of claim 2, wherein all the field effect transistors (FETs) of the motor switch, the freewheeling switch, and the reverse protection switch are connected to diodes, respectively.

4. The electronic stability control system of claim 1, wherein the controller makes the diagnostic current flow in the freewheeling switch in a state in which all of the motor switch, the freewheeling switch, and the reverse protection switch are turned off to make the diagnostic current flow in the diodes of the freewheeling switch and the reverse protection switch since all the switches are turned off so as to detect the fault based on the fact that a voltage drop is not generated when one or two of the freewheeling switch and the reverse protection switch are in a short state or a stuck on state by using the voltage detector.

5. The electronic stability control system of claim 1, wherein the controller turns on only the freewheeling switch and then makes the diagnostic current flow, in the state in which only the motor switch and the reverse protection switch are turned off to detect the voltage drop generated when the freewheeling switch is in a stuck-off state or an open state by using the voltage detector.

6. The electronic stability control system of claim 1, wherein the controller turns on only the reverse protection switch and then makes the diagnostic current flow, in the state in which only the motor switch and the freewheeling switch are turned off to detect the fault based on the voltage drop generated when the reverse protection switch is in a stuck-off state or an open state by using the voltage detector.

7. A method for detecting a fault of a motor freewheeling circuit of an electronic stability control system including a motor switch for driving a motor unit, a motor driver including a freewheeling switch and a reverse protection switch for checking whether the motor unit is normally operated, a pulse width modulator, and a controller, the method comprising:
 (a) applying, by the controller, a predetermined control signal to the pulse width modulator;
 (b) generating, by the pulse width modulator, a PWM signal for driving the motor unit depending on a predetermined control signal;
 (c) driving, by the motor driver, the motor unit depending on the PWM signal; and
 (d) turning off, by the controller, the motor switch, the freewheeling switch, and the reverse protection switch depending on a specific combination, applying a diagnostic current, and detecting a fault state of the freewheeling switch and the reverse protection switch by using a voltage detector.

8. The method of claim 7, wherein all of the motor switch, the freewheeling switch, and the reverse protection switch are operated by using a field effect transistor (FET).

9. The method of claim 8, wherein the diagnostic current flows in each diode connected to each field effect transistor (FET) when all of the motor switch, the freewheeling switch, and the reverse protection switch are in a turned off state.

10. The method of claim 7, wherein in the step (d), the controller makes the diagnostic current flow in the freewheeling switch in a state in which all of the motor switch, the freewheeling switch, and the reverse protection switch are turned off to make the diagnostic current flow in the diodes of the freewheeling switch and the reverse protection switch since all the switches are turned off so as to detect the fault based on the fact that a voltage drop is not generated when one or two of the freewheeling switch and the reverse protection switch are in a short state or a stuck on state by using the voltage detector.

11. The method of claim 7, wherein in the step (d), the controller turns on only the freewheeling switch and then makes the diagnostic current flow, in the state in which only the motor switch and the reverse protection switch are turned off to detect the fault based on the voltage drop generated when the freewheeling switch is in a stuck-off state or an open state by using the voltage detector.

12. The method of claim 7, wherein in the step (d), the controller turns on only the reverse protection switch and then makes the diagnostic current flow, in the state in which only the motor switch and the freewheeling switch are turned off to detect the fault based on the voltage drop generated when the reverse protection switch is in a stuck-off state or an open state by using the voltage detector.

* * * * *